United States Patent
Ren

(10) Patent No.: US 8,452,244 B2
(45) Date of Patent: May 28, 2013

(54) DISCONTINUOUS RECEPTION/TRANSMISSION FOR MOBILE COMMUNICATION SYSTEM

(75) Inventor: Weili Ren, Berkshire (GB)

(73) Assignee: NEC Corporation, Tokyo (JP)

( * ) Notice: Subject to any disclaimer, the term of this patent is extended or adjusted under 35 U.S.C. 154(b) by 456 days.

(21) Appl. No.: 12/530,567

(22) PCT Filed: Mar. 3, 2008

(86) PCT No.: PCT/JP2008/054225
§ 371 (c)(1),
(2), (4) Date: Sep. 9, 2009

(87) PCT Pub. No.: WO2008/111542
PCT Pub. Date: Sep. 18, 2008

(65) Prior Publication Data
US 2010/0144299 A1    Jun. 10, 2010

(30) Foreign Application Priority Data

Mar. 9, 2007    (GB) .................................... 0704606.3

(51) Int. Cl.
*H03C 1/62* (2006.01)

(52) U.S. Cl.
USPC .................................... 455/115.1; 455/127.5

(58) Field of Classification Search ............... 455/115.1
See application file for complete search history.

(56) References Cited

U.S. PATENT DOCUMENTS

| | | | | |
|---|---|---|---|---|
| 5,835,889 | A * | 11/1998 | Kapanen ........................ | 704/215 |
| 7,548,519 | B2 | 6/2009 | Motegi et al. | |
| 7,684,799 | B2 * | 3/2010 | Kuchibhotla et al. ......... | 455/436 |
| 7,734,264 | B2 * | 6/2010 | Rao et al. ..................... | 455/127.5 |
| 8,094,554 | B2 * | 1/2012 | Gholmieh et al. ............ | 370/230 |
| 8,094,595 | B2 * | 1/2012 | Montojo et al. .............. | 370/311 |
| 2002/0064140 | A1 * | 5/2002 | Numminen ..................... | 370/311 |
| 2003/0117968 | A1 | 6/2003 | Motegi et al. | |
| 2003/0185162 | A1 | 10/2003 | Fraser et al. | |
| 2007/0129017 | A1 * | 6/2007 | Dalsgaard et al. ......... | 455/67.11 |
| 2007/0291728 | A1 * | 12/2007 | Dalsgaard et al. ............ | 370/347 |
| 2011/0305182 | A1 * | 12/2011 | Suzuki et al. ................. | 370/311 |
| 2012/0106420 | A1 * | 5/2012 | Suzuki .......................... | 370/311 |

FOREIGN PATENT DOCUMENTS

| | | |
|---|---|---|
| EP | 1 294 206 | 3/2003 |
| EP | 1 435 709 | 7/2004 |
| JP | 2003-179539 | 6/2003 |
| JP | 2005-057685 | 3/2005 |
| WO | 2007024095 | 3/2007 |

OTHER PUBLICATIONS

International Search Report, PCT/JP2008/054225, Jun. 6, 2008.
NTT DoCoMo, Inc. Views on DRX/DTX control in LTE, 3GPP Tdoc R2-063397, Nov. 10, 2006, 2.1.1 Operation example.

(Continued)

*Primary Examiner* — Ajibola Akinyemi

(74) *Attorney, Agent, or Firm* — Young & Thompson

(57) ABSTRACT

The present invention provides for a method of controlling discontinuous reception cycles in a mobile radio communications device, and discontinuous transmission cycles in a mobile radio communication network device, and comprising the steps of monitoring the number of consecutive discontinuous reception and transmission periods within which no data is received, monitoring the number of consecutive discontinuous reception and transmission periods within which data is received, and varying the said discontinuous reception cycle responsive to the result of said monitoring.

15 Claims, 6 Drawing Sheets

OTHER PUBLICATIONS

Panasonic, DRX and DTX Operation in LTE_Active, 3GPP TSG-RAN WG2, R2-060888, 2006.

Nokia, Active Mode DRX, 3GPP TSG-RAN WG2, R2-062752, 2006.

LG Electronics, DRX Scheme, 3GPP TSG-RAN WG2, R2-063248, 2006.

Nokia, Measurements in E-UTRAN, 3GPP TSG-RAN WG2, R2-063068, 2006.

Nokia, Active mode DRX details, 3GPP TSG-RAN WG2, R2-063081, 2006.

JP Office Action dated May 9, 2012, Application No. 2009-538935, with English Translation.

Extended European Search Report dated Jul. 5, 2012, Application No. 08721642.0.

NTT Docomo et al. "Views on DRX/DTX control in LTE", 3GPP Draft; R2-070279, 3rd Generation Partnership Project (3GPP), Mobile Competence Centre; 650, Route Des Lucioles; F-06921 Sophia-Antipolis Cedex; France, vol. RAN WG2, No. Sorrento, Italy; Jan. 12, 2007, XP050133368.

Research in Motion Limited: "Supporting Long DRX in LTE_ACTIVE for Non-Realtime Traffic", 3GPP Draft; R2-070101, 3rd Generation Partnership Project (3GPP), Mobile Competence Centre; 650, Route Des Lucioles; F-06921 Sophia-Antipolis Cedex; France, vol. RAN WG2, No. Sorrento, Italy; Jan. 12, 2007, XP050133216.

\* cited by examiner

DISCONTINUOUS RECEPTION/TRANSMISSION FOR MOBILE COMMUNICATION SYSTEM

TECHNICAL FIELD

The present invention relates to a mobile radio communication system, and in particular to a mobile radio communications device, mobile radio communications network device and to related method of controlling discontinuous reception/transmission cycles therein.

BACKGROUND ART

An important consideration relating to mobile radio communication devices and networks arranged to support the same, is one of power consumption and efficiency of operation. Such mobile devices, by definition, will need to include an onboard power source.

While improvement in battery technology has assisted in prolonging the operational period before a battery recharge is required, control aspects have also been introduced into the operation of the mobile radio communications device User Equipment (UE) in order to enhance the efficiency with which the UE operates within the network.

It is commonly provided for the UE to switch between active and idle states and it is also known that, while the UE is operating in an active state, further control measures such as Discontinuous Reception (DRX) and Discontinuous Transmission (DTX) can be employed so as to allow for a relatively low-power mode even when the UE is in an active state.

DRX is primarily employed by the UE and advantageously determines that the UE does not need to continuously monitor all possible paging channels.

DTX is generally employed within a network node so as to provide for suspension of transmissions therefrom which, while being allied with the power saving that can then be achieved by the DRX within the UE, also assists in limiting network traffic.

Proposals made within the 3GPP and concerning Long Term Evolution (LTE) systems have focussed in particular on consideration of the DRX and DTX cycles particularly since LTE comprises a packet-centric system where data packets are generally sent/delivered in a "bursty" and discontinuous manner such that such potential power savings from DRX and DTX operation could prove significant.

For example, proposals presented in previous RAN2 meetings suggested that the DRX cycle could be controlled to optimise power saving performance and meet the conflicting requirements above. The proposal in R2-063397 "Views on DRX/DTX control in LTE, NTT DoCoMo" suggested that DRX cycle can be implicitly extended by a pre-defined rule and that the extension is triggered by a timer. If the eNB has no buffered data to transmit when the UE wakes up at end of a DRX period, the UE goes back to the configured minimum DRX cycle (which could be a continuous reception mode). It has been proposed in R2-060888 "DRX and DTX Operation in LTE_Active" Panasonic, that the eNB could assign and alter active and sleeping periods via explicit MAC signalling according to UE activity level. However this would represent a MAC signalling intensive DRX scheme. In a proposal in R2-063248 "DRX Scheme" LG Electronics, a two-level DRX scheme is presented in which two DRX cycles are configured by RRC during the radio bearer establishment to reduce Layer1/Layer2 (L1/L2) signalling overhead. Alternatively the eNB would use explicit MAC signalling to switch between the different DRX cycles. Another two-level flexible DRX scheme was proposed in R2-063081 "Active mode DRX" Nokia and R2-062752 "Active Mode DRX" Nokia, which employs a regular DRX cycle (long DRX cycle) and interim DRX cycle (short DRX cycle). The regular DRX parameters are configured at RRC layer, while the interim DRX parameters are assigned by MAC signalling.

With regard to such proposals however, disadvantages and limitations have been identified, for example, the proposed DRX schemes either incur L1/L2 signalling overhead to achieve flexibility and adaptiveness in DRX setting, or with just use RRC signalling for DRX configuration and thereby lose the ability to adapt to UE activity level.

While the above mentioned suggested systems might be considered to perform adequately within one scenario, such limitation to only one scenario is itself considered to represent a further restriction.

DISCLOSURE OF THE INVENTION

The present invention therefore seeks to provide for a communications device UE, and related mobile radio communications network device and common system and method of controlling the same, having advantages over known such devices, systems and methods.

In particular, the present invention seeks to provide for a DRX/DTX scheme, which is advantageously particularly suited to LTE_ACTIVE operation and that serves to strike a balance between power saving performance and packet delay tolerances.

According to one aspect of the present invention, there is provided a method of controlling discontinuous reception cycles in a mobile radio communications device, comprising the steps of monitoring the number of consecutive discontinuous reception periods within which no data is received, monitoring the number of consecutive discontinuous reception periods within which data is received, and varying the said discontinuous reception cycle responsive to the result of said monitoring.

The present invention proves advantageous in that it provides for a generic Discontinuous Reception (DRX) scheme that effectively balances the required power saving performance and packet delay tolerances through the adaptive adjustment of the DRX cycle based upon the UE activity level that is determined through the monitoring of the aforementioned consecutive DRX periods. Through monitoring the number of such consecutive periods, the UE activity level is advantageously monitored in a manner which also takes into account radio bearer QoS requirements. Further, it is advantageously found that Radio Resource Control (RRC) and Medium Access Control (MAC) signalling commonly employed for DRX cycle assignments can likewise be minimised. This proves to be particularly suitable both for non-real-time services and also for real-time services.

Of course in one embodiment it should be appreciated that the mobile radio communications device can comprise mobile network UE in a form of, for example, a cellular phone handset.

Yet further, the method can include the step of controlling a transition from an active mode to idle mode responsive to the current discontinuous reception cycle and the result of said monitoring. Yet further, the method can include the step of controlling the transition of the mobile radio communications device from an active state to a continuous reception state responsive to the discontinuous reception cycle and the result of said monitoring.

According to another aspect of the present invention, there is provided a method of controlling discontinuous transmission cycles within a mobile radio communications network device, comprising the steps of monitoring the number of consecutive DTX periods within which no data is transmitted, monitoring the number of consecutive DTX periods within which data is transmitted, and varying the said discontinuous transmission cycle responsive to the result of said monitoring.

Of course it will be appreciated that within this aspect of the present invention, the mobile radio communications network device can advantageously comprise a network node device, and, in particular, an eNodeB.

Advantageously, the step of monitoring comprises the step of counting the said consecutive periods.

In particular, the varying of the said cycles is then controlled responsive to the count exceeding a threshold value.

Yet further, the method is advantageously arranged such that if the count of consecutive periods without data exceeds the threshold value, the said cycle is varied in a manner to increase the cycle.

If, however, the count of consecutive periods with data exceeds a threshold value, then the cycle is varied so as to decrease the said cycle.

According to a further advantageous feature, the said threshold values are arranged to be configured, or reconfigured, along with the addition, modification or removal of a radio bearer.

Such reconfiguration then advantageously takes into account QoS requirements of all the established radio bearers. The thresholds that are configured in this manner advantageously provide for an appropriate balance between the required power-saving performance and the packet latency that can be tolerated.

According to another aspect of the present invention, there is provided a method of controlling discontinuous operation within a mobile radio communications system and including the method steps outlined above and wherein the periods within which no data is received correspond to periods within which no data is transmitted, and periods within which data is received corresponding to periods within which data is transmitted.

This aspect of the present invention emphasises the particular advantageous feature that the respective counts occurring within the mobile radio communications device, and the mobile radio communications network device will naturally correspond to each other and that the increase or decrease in the said cycles will likewise correspond.

In this manner, the adaptive control of the discontinuous cycles within the mobile radio communications device will be mirrored by the mobile radio communications network device without requiring any specific signalling.

According to another aspect of the present invention, there is provided a mobile radio communications device arranged for operation in a discontinuous reception mode exhibiting discontinuous reception cycles and including means for monitoring the number of consecutive discontinuous reception periods within which no data is received, means for monitoring the number of consecutive discontinuous reception periods within which data is received, and the device being arranged to vary the said discontinuous reception cycles responsive to the result of the said monitoring.

Advantageously, the said means for monitoring the said periods comprises counter means. In particular, a counter can be provided for monitoring the number of consecutive discontinuous reception periods with no data, and a separate counter can be provided for monitoring the discontinuous reception periods with data.

Further, the means for varying the discontinuous reception cycles are arranged to operate responsive to the count exceeding a threshold value.

That is, if the count of the consecutive periods with no data exceeds a threshold, then the discontinuous reception cycles are likewise arranged to be increased.

If the count of the consecutive periods with data exceeds the threshold value, then the discontinuous reception cycles is decreased.

It will of course be appreciated that the present invention is particularly suited to a mobile radio communications device comprising a LTE handset arranged for operation in an LTE network arrangement.

The device can then be arranged to move from an active to an idle mode responsive to the current discontinuous reception cycle and the result of the said monitoring.

Further, the handset can be arranged to move from an active to a continuous reception mode likewise responsive to the current discontinuous reception cycle and the result of said monitoring.

The device can further include timer means for control of entry to a discontinuous reception mode from a continuous reception mode and by way of a threshold timer value configured during radio bearer establishment.

Preferably, the timer is arranged initially to be set after the mobile radio communications device has sent a HARQ_ACK for previous data reception.

According to a further aspect of the present invention, there is provided a mobile radio communications network device arranged for operation within a discontinuous transmission mode exhibiting discontinuous transmission cycles and including means for monitoring the number of consecutive discontinuous transmission periods within which no data is transmitted, means for monitoring the number of consecutive discontinuous transmission periods within which data is transmitted, and the device further being arranged to varying the said discontinuous transmission cycles responsive to the result of the said monitoring.

Advantageously, the said means for monitoring the said periods comprises counter means. In particular, counter can be provided for monitoring the number of consecutive discontinuous transmission periods with no data, and a separate counter can be provided for monitoring the discontinuous transmission periods with data.

Further, the means arranged for varying the discontinuous transmission cycles are arranged to operate responsive to the count exceeding a threshold value.

That is, if the count of the consecutive periods with no data exceeds a threshold, then the discontinuous transmission cycles are likewise arranged to be increased.

If the count of the consecutive periods with data exceeds the threshold value, then the discontinuous transmission cycles are arranged to be decreased.

As above, it will of course be appreciated that the present invention is particularly suited to a mobile radio communications device comprising a LTE handset arranged for operation within a LTE network arrangement.

The device can then be arranged to move from an active mode to an idle mode responsive to the current discontinuous transmission cycle and the result of the said monitoring.

Further, the handset can be arranged to move from an active mode to a continuous reception mode likewise responsive to the current discontinuous transmission cycle and the result of said monitoring.

The device can further include timer means for control of entry to a discontinuous transmission mode from a continuous transmission mode and by way of a threshold timer value configured during radio bearer establishment.

Preferably, the timer is arranged initially to be set after the mobile radio communications device has sent a HARQ_ACK for previous data reception.

According to yet a further aspect of the present invention, there is provided a communications network system including a mobile radio communications device, and mobile radio communications network device as defined above.

As noted, the present invention lends itself in particular to LTE since this is a packet-centric system where packet arrivals are in general bursty and discontinuous so that power saving from DRX operation could be significant. It is also anticipated that the UE could remain in the connected mode for a relatively long period in LTE systems, such that efficient DRX operation for the UE in LTE_ACTIVE state can prove particularly important.

At the joint RAN2, RAN3 and SA2 meeting Draft Report of Joint 3GPP TSG RAN WG2 & RAN WG3 & SA WG2 Me3eting, v. 003, it was agreed as a working assumption that power saving in LTE-ACTIVE state should be comparable to that in LTE_IDLE state.

However, two conflicting requirements for DRX configuration are noted, i.e. a large DRX cycle for better power saving performance and small DRX cycle for reduced packet latency and the present invention can achieve this. Balancing can advantageously be provided between the two requirements according to service type, QoS requirement, etc. Furthermore, DRX cycle and related parameters can be configured on radio bearer basis since each radio bearer has its own QoS requirement.

While attributes such as delay requirement and packet arrival pattern will be different for each traffic type, and the optimum DRX setting will depend on service type, the present invention is found to be sufficiently adaptive to handle different traffic types. The DRX cycle can also be configured according to UE activity level in LTE_ACTIVE, although UE activity level may vary dynamically.

BEST MODE FOR CARRYING OUT THE INVENTION

It should be noted that generally the DRX operation in this description refers to the UE DRX/eNB DTX operation. Hence, the UE should not be restricted to transmitting UL (Uplink) data only when it is timed to wake-up at end of DRX period in the DRX operation. Uplink (UL) data transmission can be initiated anytime during the sleep period and the UE then returns to a sleep mode upon completion of the uplink transmission.

As will be appreciated, the invention can provide for a generic adaptive DRX scheme for LTE_ACTIVE, in which in this illustrated embodiment DRX cycle adjustment is triggered by two counters that track UE activity level in the UE and eNB respectively. One counter counts consecutive DRX periods, during which data is transmitted from the eNB to UE. The other counter counts consecutive DRX periods, during which no such data is transmitted. When one of the counters reaches the trigger threshold, the DRX/DTX cycle is extended or shortened in the UE and eNB as required. Since the eNB and UE share the exact same knowledge of data transmission they will extend or shorten DTX/DRX cycle in conformity, without requiring any RRC or MAC signalling. Further, when a radio bearer is added, modified or removed, the trigger thresholds for DRX cycle adjustment and other DRX operation parameters can be configured or reconfigured by the eNB according to QoS of the radio bearer.

Figure 8:
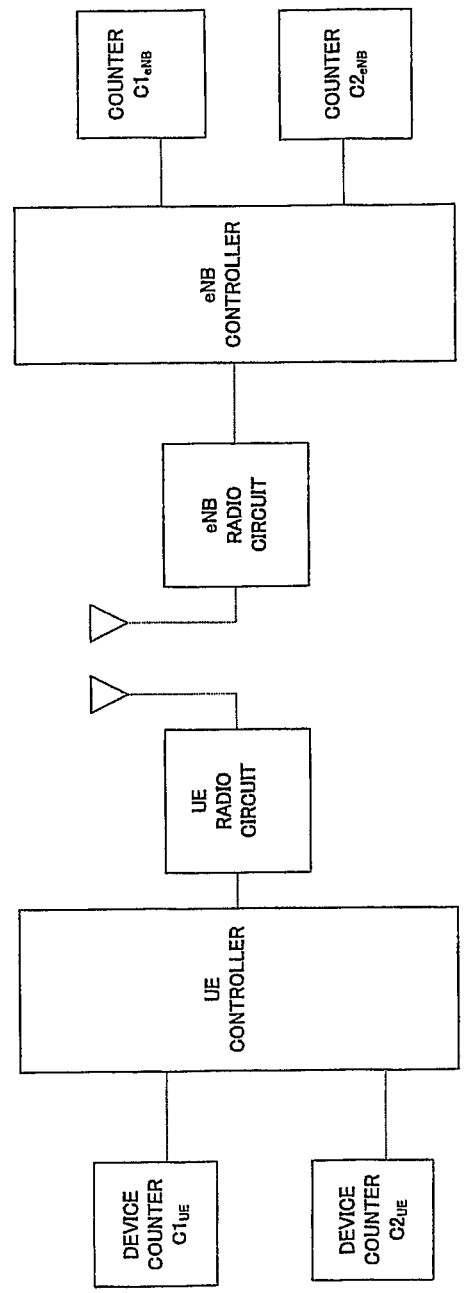
FIG. 8 shows a schematic block diagram of a network system according to the present invention.

For a better understanding of the present invention, description would be explicitly made with reference to FIG. 8 about a network system which carries out the above-mentioned operation. The network system illustrated in FIG. 8 includes a UE device which acts as a mobile radio communication device and an eNB which may be an evolved Node Base station. For brevity of description, the UE device is specified by two device counters $C1_{UE}$ and $C2_{UE}$, a UE controller, and a UE radio circuit while the eNB is also specified by two counters $C1_{eNB}$ and $C2_{eNB}$, an eNB controller, and an eNB radio circuit. As shown in FIG. 8, the UE controller is connected between the device counters $C1_{UE}$ and $C2_{UE}$ and the UE radio circuit and carries out a control operation, such as a data transfer control operation, an operation for monitoring and varying DTX/DRX cycles. On the other hand, the eNB controller is connected between the counters $C1_{eNB}$ and $C2_{eNB}$ and the eNB radio circuit and carried out a control operation such as a data transfer operation, an operation for monitoring and varying DTX/DRX cycles, and an operation for scheduling data transmission.

In addition, it is to be noted in the following description that the counters and their count values may be expressed by common reference symbols, such as $C1_{UE}$, $C2_{UE}$, $C1_{eNB}$, and $C2_{eNB}$.

Figure 1:
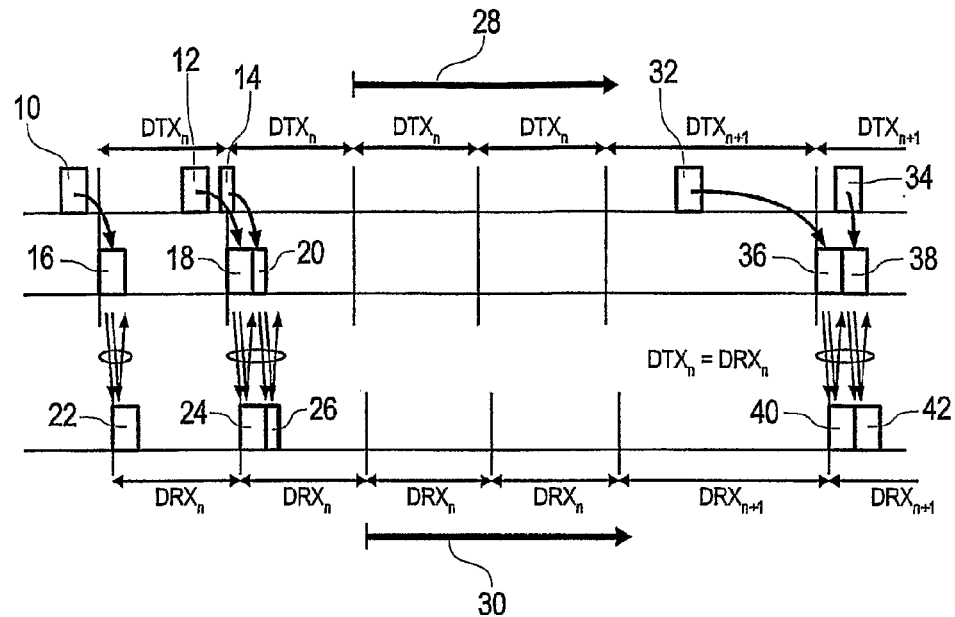
FIG. 1 is a timing diagram according to an embodiment of the present invention and serves to illustrate dynamic control of the discontinuous operation cycles serving to extend the same.

Turning first to FIG. 1, there is provided a timing diagram for a LTE device operating within its active mode and exchanging signalling with a eNB. Data blocks 10, 12 and 14 are illustrated as arriving at the eNB and are then transmitted within the Down Link (DL) 16, 18, 20 as indicated and subsequently received 22, 24 and 26 as part of a data exchange at the UE. Such data exchange can include MAC scheduling signalling, transmitted data on the DL-SCH and also HARQ-ACK/NAK signalling.

Of course, it should be appreciated that such signalling exchanges between the eNB and UE occur within a number of discontinuous transmission cycles $DTX_n$ at the eNB and wherein a plurality of matching discontinuous reception cycles $DRX_n$ arise at the UE.

Such cycles and their lengths are, as illustrated, synchronous such that, $DTX_n=DRX_n$.

As will be appreciated from FIG. 1, within the third pair of $DTX_n/DRX_n$ cycles no data is transmitted from the eNB nor received by the UE.

Each of the eNB and UE has a respective counter $C1_{eNB}$ and $C1_{ue}$ which are arranged to count the number of DTX cycles and DRX cycles respectively within which no data is transmitted/received.

The counting of such "no data" periods continues as indicated by respective arrows 28, 30 for the two clocks.

The clock counts cease once it is determined that a discontinuous operation period has occurred within which data again arises such as indicated by the data 32, and subsequent data 34 which arrives at the eNB and that is subsequently transmitted 36, 38 in the DL and received 40, 42 within part of the data exchange at the UE.

When the DRX cycle is set to be x, statistically packet latency between packet arrival and packet transmission will be equal to x/2. The UE wakes up at the end of each DRX period for possible DL data transmission. If the UE wakes up but the eNB has no data to transmit to the UE (it did not buffer any data for the UE during the previous sleeping period), the UE counts this event by incrementing a counter $C1_{UE}$. The eNB likewise uses its counter $C1_{eNB}$ in a similar manner. However, if the UE wakes up and the eNB does have some buffered data to transmit to the UE, the counter $C1_{UE}$ is reset, as is the counter $C1_{eNB}$ in the eNB at the same time. When the counter $C1_{UE}$ (and likewise the counter $C1_{eNB}$ in the eNB) reaches N, that means that the UE has not received any data from the eNB (no data has arrived at the eNB) for N DRX cycles consecutively. This is employed as an indication that the current DRX cycle may be smaller than it should be, and needs to be extended. Because the UE and eNB have the exactly same knowledge of the data transfer between them, they can initiate an identical DRX cycle extension without requiring any signalling exchange.

When the eNB has finished transmitting buffered data before the start of next wake-up time, the UE is allowed to go back to sleep mode to maximise power saving.

Figure 2:
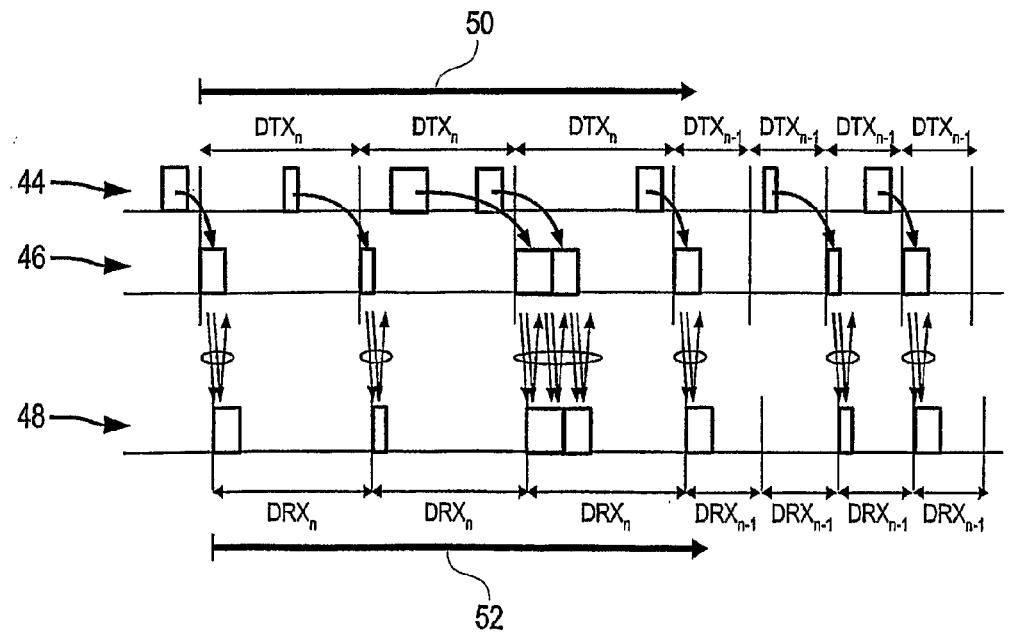
FIG. 2 is a timing diagram according to an embodiment of the present invention and serves to illustrate dynamic control of the discontinuous operation cycles serving to reduce the same.

Turning now to FIG. 2 there is provided a similar timing diagram to that of FIG. 1 insofar as it illustrates data blocks 44 arriving at the eNB that are subsequently transmitted 46 in the DL and received 48 as part of the data exchange at the UE. Respective counters $C2_{eNB}$ and $C2_{UE}$ are provided in the eNB and UE and serve to count the discontinuous operation cycles within which data is transmitted/received.

The length of such cycles is indicated by $DTX_n$ and $DRX_n$ in this figure also.

In the operation, the embodiment illustrated by FIG. 2, the discontinuous operation cycle is adaptively arranged to become shortened on the basis of the result of the counting period 50, 52 of the respective clocks.

In further detail, if the UE wakes up and the eNB has data to transmit to it, the UE counts this event by incrementing another counter $C2_{UE}$. The eNB also uses its own counter $C2_{eNB}$ which is likewise incremented. If the UE wakes up and the eNB has no data to transmit to it, counter $C2_{UE}$ is reset in the UE, at the same time $C2_{eNB}$ is reset in the eNB. When counter $C2_{UE}$ (and $C2_{eNB}$ at the same time) reaches M, this means that the UE has received data from eNB for M DRX cycles consecutively. It serves to indicate that the current DRX cycle may be larger than it can be, and should be shortened. For the same reason as noted above, the UE and eNB can take an identical DRX cycle shortening without any signalling exchange.

In situations where a large amount of data might have been buffered during the previous sleep period, the UE may not have chance to go back to sleep before the next wake-up time. In this case the eNB just continues transmitting data across DRX boundaries. Alternatively, it can be defined as an extra trigger for the UE and eNB to leave DRX operation and go to continuous RX mode.

Figure 3:
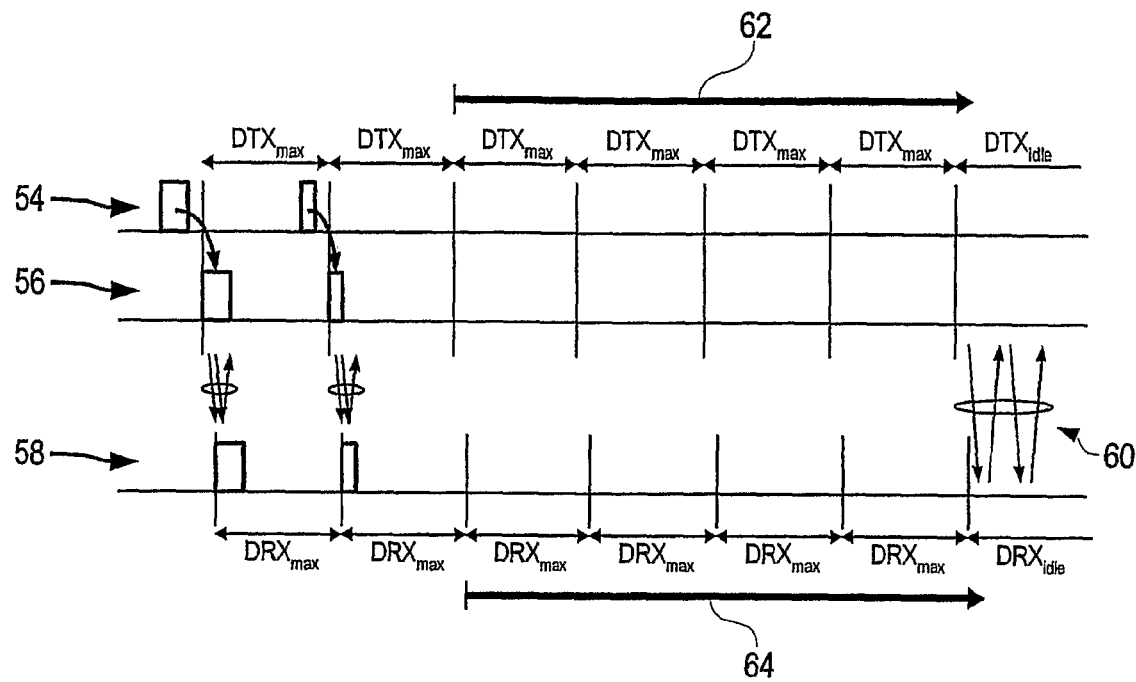
FIG. 3 is a timing diagram of an embodiment of the present invention and serves to illustrate the transition of a LTE device embodiment of the present invention entering the LTE_IDLE state.

With regard to FIG. 3, there is illustrated a further signalling diagram serving to illustrate the manner within which UE can be arranged to enter its LTE_IDLE state from its LTE_ACTIVE state.

Again, the initial signalling 54 arriving at the eNB, subsequently transmitted 56 in the DL and received 58 in the UE is illustrated.

Also, upon entry into the idle state, optional RRC signalling exchanges are indicated which can comprise RRC release request/confirmation and paging signalling 60.

The same clocks as were indicated in relation to FIG. 1 are respectively employed within the eNB and UE and serve to provide for the counting periods indicated by arrows 62, 64.

N and M again comprise the triggering criteria for extending or shortening the DRX cycle. The actual choice of triggering criteria is a trade-off between power-saving performance and packet latency requirement for a specific radio bearer. The shorter the delay that the radio bearer QoS requires, the larger N and the smaller M are chosen to be the longer delay the radio bearer can tolerate, the smaller N and the larger M are chosen to be. Counters $C1_{UE}$ and $C2_{UE}$ in the UE ($C1_{eNB}$ and $C2_{eNB}$ in the eNB) work in tandem to ensure DRX settings keep up with, and remain relevant to any change of UE activity level.

While it is appreciated that each established radio bearer may have a different packet arrival pattern, and exhibit a variation in range of activity level according to the service type, the invention can advantageously adapt to this. Some service types have a large variation range of activity level such as web-browsing, while the other service types have a small variation range of or even constant activity level such as VoIP. Therefore different radio bearers may require a pair of $DRX_{min}$ and $DRX_{max}$ values to indicate a different variation range. In the extreme case of VoIP, $DRX_{min}=DRX_{max}=20, 40$ or 80 ms depending on the adopted codec and $N=M=\infty$.

In a scenario in which the DRX cycle has reached $DRX_{max}$, but the count value in the counters $C1_{UE}$ and $C1_{eNB}$ keeps on increasing, exceeding threshold $N_{Idle}$, this is taken to indicate that the UE is experiencing a long enough inactive period and that it is time for the UE to enter LTE_IDLE state such as illustrated in FIG. 3.

Figure 4:
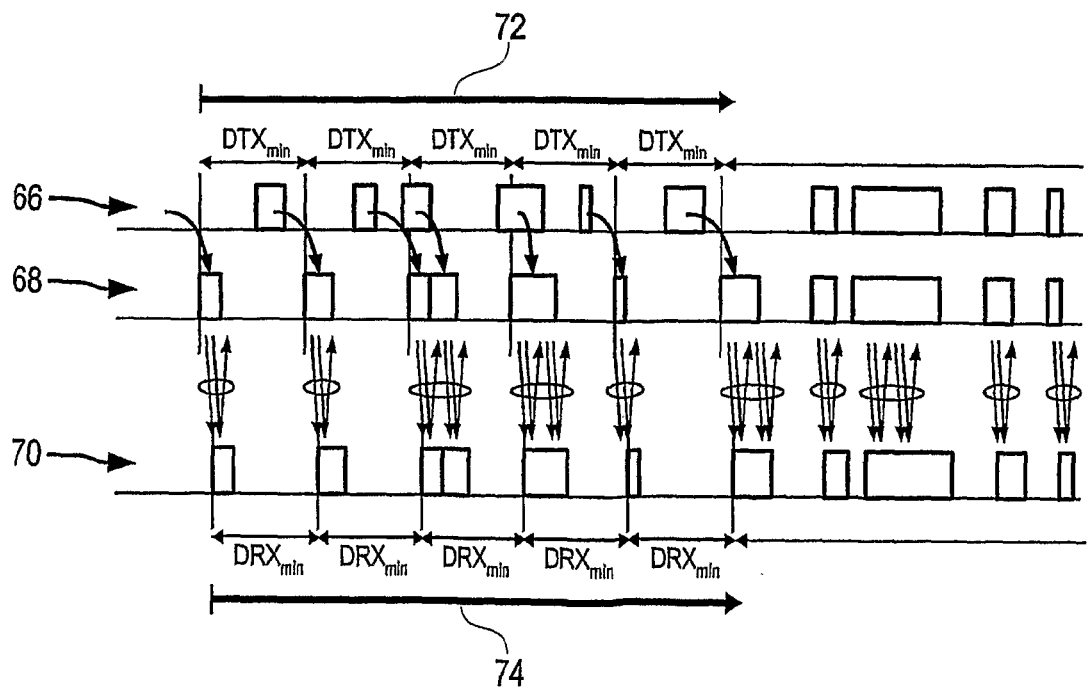
FIG. 4 is a timing diagram of an embodiment of the present invention and serves to illustrate the transition of a LTE device embodiment of the present invention entering the continuous DRX mode.

Reference is now made to FIG. 4 which again offers a similar signalling diagram for data 66 arriving at the eNB transmitted 68 in the DL and received 70 at the UE.

Clocks such as those indicated in relation to the operation illustrated by FIG. 2 are again employed within the eNB and UE respectively and at the end of the respective counting periods 72, 74 it is determined that a continuous transmission/reception mode can be entered.

In this example, when DRX cycle has reached $DRX_{min}$, but the count values of the counters $C2_{UE}$ and $C2_{eNB}$ keep increasing, exceeding threshold $N_{conti}$, this serves to indicate that it is time for the UE to return to continuous RX mode.

Figure 5:
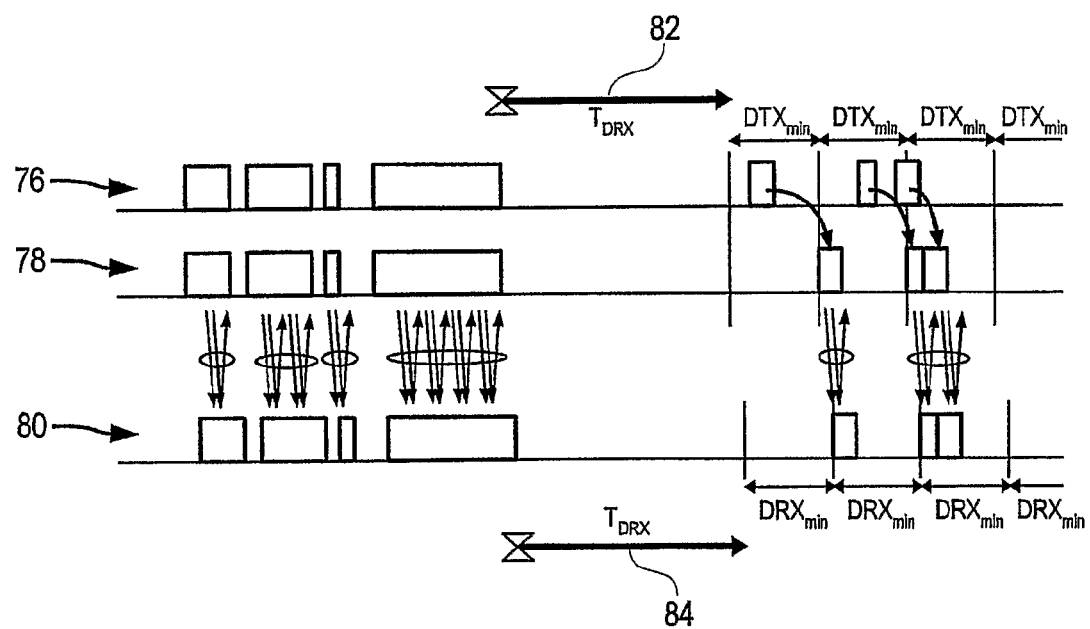
FIG. 5 is a timing diagram of an embodiment of the present invention and serves to illustrate the transition of a LTE device embodiment of the present invention entering the LTE_ACTIVE DRX mode.
Figure 6A:
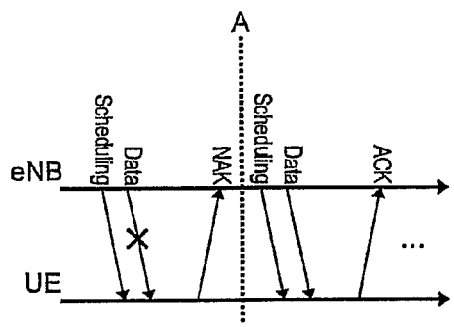
FIGS. 6A-6D illustrates four potential error scenarios that can advantageously be addressed according to the present invention.
Figure 6B:
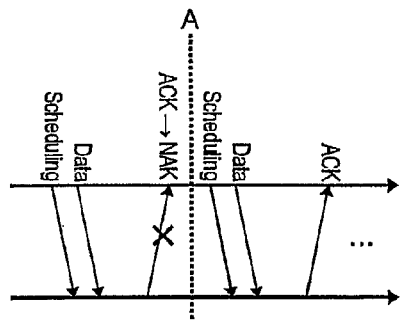
Figure 6C:
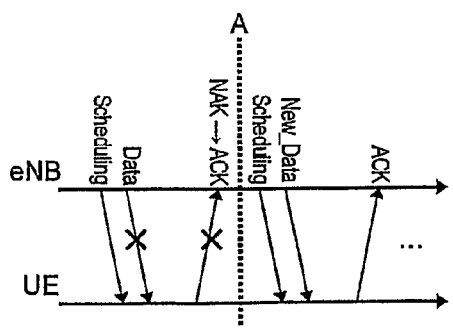
Figure 6D:
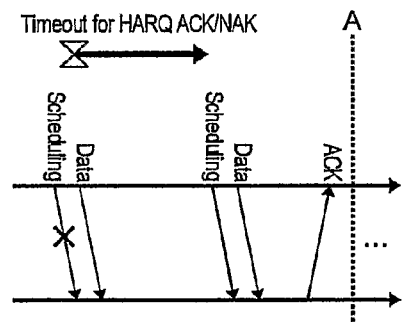

Turning now to FIG. 5, there is illustrated a mode of operation which can be provided by the inclusion of specific timers within the eNB and UE so as to assist with the controlled entry of the UE into its LTE_ACTIVE DRX operational mode.

Present active data blocks 76, 78, 80 are illustrated for the eNB, DL transmission and UE receipt respectively and initiation and extent of the time operation is indicated respectively for the eNB and LIE by arrows 82, 84.

For entering DRX mode from continuous RX mode, timers $T_{enter,eNB}$ can be adopted in the UE and eNB respectively, and timeout value $T_{DRX}$ can be configured during the radio bearer establishment. The timers are set after the eNB receives HARQ-ACK for the previous data transmission in the eNB and after the UE sends HARQ-ACK for the previous data reception in the UE respectively. When the timers expire, the UE enters DRX mode and the eNB enters DTX mode for this UE at the same time.

As noted above, the invention advantageously does not need MAC or RRC signalling exchanges between the UE and eNB to achieve a matched adjustment in DRX cycle, since the UE and eNB have exactly the same knowledge of data transfer that has just happened between them. They can always take the same DRX cycle adjustment action: unchanging, extending or shortening, even if errors occur during DL data transmissions, thanks to HARQ operation. FIG. 6 shows four error cases that could happen to DL data transmissions when the UE wakes up and the eNB has data to transmit to it. All possible errors will be one of these errors or a combination of them.

In all the four cases, from time instance A onward, both the UE and eNB already know that data transfer is happening between them, and can count the event conformably without mismatch therebetween. That is, upon the UE sending out a HARQ ACK or NAK, it starts counting; upon the eNB receiving a HARQ ACK or NAK, it starts counting. This advantageously serves to ensure the robustness and reliability of the proposed DRX cycle adjustment and without requiring any signalling.

As may be appreciated, the descriptions above assume that packet arrival pattern is not always in long bursts. As a simple example, one web page may consist of data from several servers. In this case, the required delivery time of each component of that web page will be quite different. Even if the web page originates from one sever, a different part of the page may experience different transfer time because of its different routing path, or due to network congestion. Although the total transmission time will be short compared to the DRX cycle, the transmission itself may not be continuous and will exhibit gaps.

It has been noted from R2-063068, "Measurements in E-UTRAN" Nokia that LIE measurement requirements and reporting criteria can be adjusted and aligned with the currently adopted DRX cycle of the UE, since such an arrangement is most robust and gives good power saving capabilities without introducing overly complex specification work. This has been agreed as a working assumption in 3FPP RAN2#56bis meeting. The only disadvantage might be that identification of new cells might be delayed if a long DRX cycle is applied. However, long DRX cycles are adopted in a UE whose data reception activity is rather low and thus negative impact should be rather limited.

To further illustrate one particular embodiment of the invention, reference is now made to examples of parameters required in accordance with the illustrated embodiment.

The proposed scheme requires that two counters denoted as $C1_{UE}$ and $C2_{UE}$ in the UE, $C1_{eNB}$ and $C2_{eNB}$ in the eNB respectively are adopted. A timer can be adopted, denoted as $T_{enter,UE}$ in the UE and $T_{enter,eNB}$ in the eNB. In addition, a set of DRX parameters are defined and their meanings have been described above:

$T_{DRX}$
N
M
$N_{Idle}$
$N_{conti}$
$I_{min}$: index to $DRX_{min}$
$I_{max}$: index to $DRX_{max}$ Also, a series of DRX cycles are pre-defined in the eNB and each UE:

$DRX_0 < DRX_1 < \ldots < DRX_{n-1} < DRX_n < DRX_{n+1} < \ldots$
(e.g. 20, 40, 80, 160, 320, ... ms)

Figure 7:
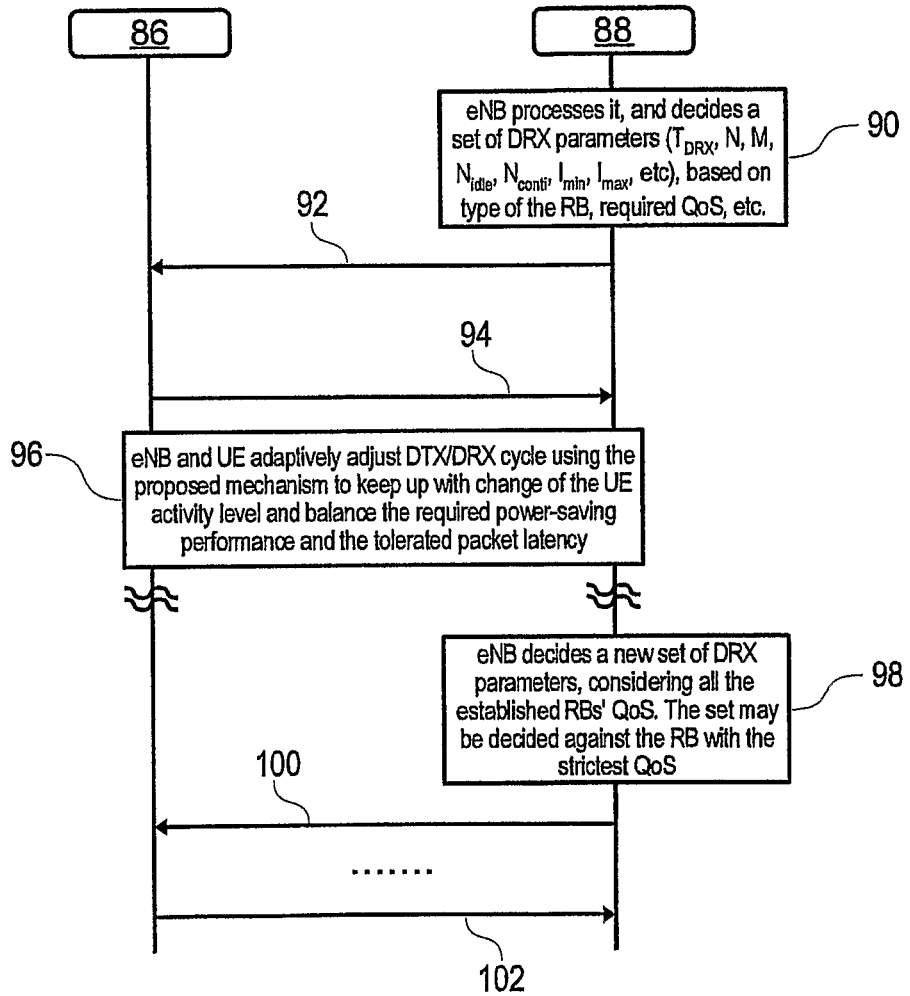
FIG. 7 comprises a signalling diagram between user equipment (UE) and an eNodeB of a system embodying the present invention and in particular the discontinuous transmission and discontinuous reception configuration and reconfiguration by the Radio Resource Controller.

IF (current DRX period has no data transmitted from eNB to UE)
  $C1_{UE}+1 \rightarrow C1_{UE}$ and $0 \rightarrow C2_{UE}$ in UE
  $C1_{eNB}+1 \rightarrow C1_{eNB}$ and $0 \rightarrow C2_{eNB}$ in eNB
/* These counters are incremented or reset conformingly in UE and eNB since they have the exactly same knowledge of data transmission in current DRX period */
IF ($C1_{UE} >= N$ and current DRX cycle$<DRX_{max}$)/*$C1_{eNB} >= N$ and current DTX cycle
  $<DTX_{max}$ must hold at the same time */
  $DRX_{n+1} \rightarrow$ current DRX cycle and $0 \rightarrow C1_{ue}$ in UE
  $DTX_{n+1} \rightarrow$ current DTX cycle and $0 \rightarrow C1_{eNB}$ in eNB
ELSE /* current DRX period has some data transmitted from ENB to UE */
  $C2_{UE}+1 \rightarrow C2_{ue}$ and $0 \rightarrow C1_{UE}$ in UE
  $C2_{eNB}+1 \rightarrow C2_{eNB}$ and $0 \rightarrow C1_{eNB}$ in eNB
IF ($C2_{UE} >= M$ and current DRX cycle$>DRX_{min}$)/*$C2_{eNB} >= M$ and current DTX cycle
  $>DTX_{min}$ must hold at the same time */
  $DRX_{n-1} \rightarrow$ current DRX cycle and $0 \rightarrow C2_{UE}$ in UE
  $DTX_{n-1} \rightarrow$ current DTX cycle and $0 \rightarrow C2_{eNB}$ in eNB Reference is finally made to FIG. 7 which illustrates DTX/DRX configuration and reconfiguration by way of a RRC with regard to UE 86 and an eNB 88.

To concisely illustrate the DRX cycle adjustment of the proposed scheme, the above algorithm omitted the trivial part for checking if the current DRX/DTX cycle has reached $DRX_{min}$ or $DRX_{max}$. However, FIG. 7 shows how the eNB configures or reconfigures DRX operation and relevant parameters when a new radio bearer is added or an existing radio bearer is modified or released. When there are two or more radio bearers established in a UE, the eNB will consider all the established radio bearers' QoS requirement. Alternatively the eNB may simply decide a set of DRX parameters against the radio bearer that has the strictest QoS requirement.

With regard to FIG. 7 there is specifically illustrated a scenario wherein, at the eNB 88, a new radio bearer is established having a specific QoS.

At step 90, the eNB processes signalling and makes a determination of the relevant set of DRX parameters such as those discussed above ($T_{DRX}$, N, M, $N_{Idle}$, $N_{conti}$, $I_{min}$, $I_{max}$, etc) as based on the type of radio bearer arising and required QoS etc.

Subsequent to such processing, a signal 92 is transmitted from the eNB 88 to the UE 86 indicating that RRC connection is required and, in return, a RRC connection confirmation signal 94 is transmitted from the LIE 86 to the eNB 88.

At 96, and in accordance with the present invention, the UE 86 and eNB 88 adaptively adjust their DRX/DTX cycles by means of the counting mechanism described above and so as to effectively monitor and track any change in UE activity level and thereby balance the required power-saving performance and packet latency tolerance.

Subsequent to such adaptive adjustment at 96, should the eNB 88 decide that a new set of DRX parameters is required, for example, with regard to all of the established radio bearers and QoS, then such new parameters can be employed at step 98 and the set may be determined with regard to the radio bearer exhibiting the strictest QoS requirement.

Subsequent to such a decision being made within the eNB at step 98, RRC signalling change request 100 and change confirmation 102 signalling are exchanged between the eNB 88 and the UE 86.

As will therefore be appreciated from all of the above, the invention presents a generic and generally counter-driven adaptive DRX scheme for LTE_ACTIVE. When a UE is in LTE_ACTIVE state, two counters are running in the UE and eNB respectively to track the UE activity level. One counter counts consecutive DRX periods, during which no data is transmitted. When one of the counters reaches the trigger threshold the DRX/DTX cycle is extended or shortened in the UE and eNB. Since the eNB and UE have exactly the same knowledge of data transmission between them, they will extend or shorten DTX/DRX cycle conformingly, without needing any RRC or MAC signalling. The trigger thresholds for DRX cycle adjustment and other DRX operation parameters are configures or reconfigured by the eNB when a radio bearer is added, modified or removed. The configuration or reconfiguration takes into account QoS requirement of all of the established radio bearers if there are multiple radio bearers in the UE. The trigger thresholds that are configured according to QoS of the radio bearer therefore readily balance the required power-saving performance against the tolerated packet latency.

This application is based upon and claims the benefit of priority from UK patent application No. 0704606.3, filed on Mar. 9, 2007, the disclosure of which is incorporated herein in its entirety by reference.

The invention claimed is:

1. A method of controlling discontinuous reception (DRX) cycles in a mobile radio communications device which is operable in continuous reception of continuously receiving data, discontinuous data reception of discontinuously receiving data, and discontinuous reception (DRX) of receiving no data, comprising:
   counting a number of consecutive discontinuous reception (DRX) periods within which no data is received;
   counting a number of consecutive discontinuous data reception periods within which data is received; and
   varying a duration of the discontinuous reception (DRX) cycle responsive to a result of said count of the number of consecutive discontinuous reception (DRX) periods within which no data is received and said count of the number of consecutive discontinuous data reception periods within which data is received.

2. A method of controlling discontinuous operation within a mobile radio communications system and including the method steps of claim 1 and wherein the periods within which no data is received correspond to periods within which no data is transmitted, and periods within which data is received corresponding to periods within which data is transmitted.

3. A method of controlling discontinuous transmission (DTX) cycles within a mobile radio communications device which is operable in continuous transmission of continuously transmitting data, discontinuous data transmission of discontinuously transmitting data, and discontinuous transmission (DTX) of transmitting no data, comprising:
   counting a number of consecutive discontinuous transmission (DTX) periods within which no data is transmitted;
   counting a number of consecutive discontinuous data transmission periods within which data is transmitted; and
   varying a duration of the discontinuous transmission (DTX) cycle responsive to a result of said count of the number of consecutive discontinuous transmission (DTX) periods within which no data is transmitted and said count of the number of consecutive discontinuous data transmission periods within which data is transmitted.

4. A method as claimed in claim 3 wherein the mobile radio communications network device comprises a network node device.

5. A method of controlling discontinuous operation within a mobile radio communications system and including the method steps of claim 3 and wherein the periods within which no data is received correspond to periods within which no data is transmitted, and periods within which data is received corresponding to periods within which data is transmitted.

6. A mobile radio communications device arranged for operation in a discontinuous reception mode exhibiting discontinuous reception cycles, wherein the mobile radio communications device is operable in continuous reception of continuously receiving data, discontinuous data reception of discontinuously receiving data, and discontinuous reception (DRX) of receiving no data, comprising:
   means for counting a number of consecutive discontinuous reception (DRX) periods within which no data is received,
   means for counting a number of consecutive discontinuous data reception periods within which data is received, and
   means for varying a duration of the discontinuous reception cycle responsive to a result of the count of the number of consecutive discontinuous reception periods (DRX) within which no data is received and the count of the number of consecutive discontinuous data reception periods within which data is received.

7. A device as claimed in claim 6 wherein the means for varying the discontinuous reception cycles is arranged to operate responsive to the count exceeding a threshold value.

8. A device as claimed in claim 7 and arranged such that if the count of the consecutive periods with no data exceeds a threshold, the discontinuous reception cycle is increased.

9. A device as claimed in claim 6 and arranged such that if the count of the consecutive periods with data exceeds the threshold value, then the discontinuous reception cycle is decreased.

10. A device as claimed in claim 6 and comprising an LTE handset arranged for transition from an active mode to an idle mode responsive to the discontinuous reception cycle and the result of the said counting of the number of the consecutive discontinuous reception (DRX) periods within which no data is received.

11. A device as claimed in claim 6 and comprising an LTE handset arranged for transition from an active mode to a continuous reception mode responsive to the discontinuous reception cycle and the result of said counting of the number of the consecutive discontinuous data reception periods within which data is received.

12. A communications network system including a mobile radio communications device as claimed in claim 6 and a mobile radio communications network device arranged for operation within a discontinuous transmission mode exhibiting discontinuous transmission cycles and including means for counting the number of consecutive discontinuous transmission (DTX) periods within which no data is transmitted, means for counting the number of consecutive discontinuous data transmission periods within which data is transmitted, and the device further being arranged to varying the said discontinuous transmission cycle responsive to the result of the said counting of the number of consecutive discontinuous transmission (DTX) periods within which no data is transmitted and said counting the number of consecutive discontinuous data transmission periods within which data is transmitted.

13. A mobile radio communications network device arranged for operation within a discontinuous transmission mode exhibiting discontinuous transmission cycles, wherein the mobile radio communications network device is operable in continuous transmission of continuously transmitting data, discontinuous data transmission of discontinuously transmitting data, and discontinuous transmission (DTX) of transmitting no data, comprising:
  means for counting a number of consecutive discontinuous transmission (DTX) periods within which no data is transmitted,
  means for counting a number of consecutive discontinuous data transmission periods within which data is transmitted, and
  means for varying the discontinuous transmission (DTX) cycle responsive to a result of the count of the number of consecutive discontinuous transmission (DTX) periods within which no data is transmitted and the count of the number of consecutive discontinuous data transmission periods within which data is transmitted.

14. A network device as claimed in claim 13 and arranged to transition from an active to an idle mode responsive to the current discontinuous transmission cycle and the result of the said counting of the number of the consecutive discontinuous data transmission (DTX) periods within which no data is transmitted.

15. A network device as claimed in claim 13 and arranged to transition from an active to a continuous transmission mode responsive to the discontinuous transmission cycle and the result of said counting of the number of the consecutive discontinuous data transmission periods within which data is transmitted.

* * * * *

UNITED STATES PATENT AND TRADEMARK OFFICE
CERTIFICATE OF CORRECTION

PATENT NO.         : 8,452,244 B2
APPLICATION NO.    : 12/530567
DATED              : May 28, 2013
INVENTOR(S)        : Weili Ren Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 574 days.

Signed and Sealed this
Eighth Day of September, 2015

Michelle K. Lee
*Director of the United States Patent and Trademark Office*